(12) United States Patent
McGavran et al.

(10) Patent No.: US 9,142,254 B2
(45) Date of Patent: Sep. 22, 2015

(54) CAPTURING FRAMES FROM AN EXTERNAL SOURCE

(75) Inventors: David McGavran, San Jose, CA (US); Paul E. Young, San Francisco, CA (US); Enzo Guerrera, Monte Sereno, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1163 days.

(21) Appl. No.: 13/082,525

(22) Filed: Apr. 8, 2011

(65) Prior Publication Data

US 2013/0166626 A1 Jun. 27, 2013

Related U.S. Application Data

(63) Continuation of application No. 11/458,982, filed on Jul. 20, 2006, now Pat. No. 7,925,978.

(51) Int. Cl.
*G06F 5/00* (2006.01)
*G11B 27/034* (2006.01)

(52) U.S. Cl.
CPC .................... *G11B 27/034* (2013.01)

(58) Field of Classification Search
CPC ............. G09G 5/00; G06K 9/36; H04N 7/18; H04N 5/76
See application file for complete search history.

(56) References Cited

U.S. PATENT DOCUMENTS

| | | | |
|---|---|---|---|
| 5,610,841 A | 3/1997 | Tanaka et al. | |
| 5,748,775 A | 5/1998 | Tsuchikawa et al. | |
| 5,774,666 A | 6/1998 | Portuesi | |
| 6,137,485 A | 10/2000 | Kawai et al. | |
| 6,307,550 B1 | 10/2001 | Chen et al. | |
| 6,449,653 B2 | 9/2002 | Klemets et al. | |
| 6,587,123 B2 | 7/2003 | Ando et al. | |
| 6,650,826 B1 | 11/2003 | Hatta | |
| 6,678,332 B1 | 1/2004 | Gardere et al. | |
| 6,920,181 B1 | 7/2005 | Porter | |
| 7,325,199 B1 | 1/2008 | Reid | |
| 7,480,864 B2 | 1/2009 | Brook et al. | |
| 7,569,761 B1 | 8/2009 | Iampietro et al. | |
| 7,925,978 B1 | 4/2011 | McGavran et al. | |
| 2001/0013068 A1 | 8/2001 | Klemets et al. | |
| 2002/0124259 A1* | 9/2002 | Chang et al. ..................... | 725/91 |
| 2002/0154156 A1 | 10/2002 | Moriwake et al. | |
| 2002/0167541 A1 | 11/2002 | Ando et al. | |

(Continued)

OTHER PUBLICATIONS

Frameserving—Luke's Video Guide, 5 pages [online], [retrieved on Dec. 7, 2007]. Retrieved from the Internet URL: http://neuron2/net/LVG/frameserving.html.

(Continued)

*Primary Examiner* — Tony N Ngo
(74) *Attorney, Agent, or Firm* — Wolf-SBMC (57) ABSTRACT

Methods and apparatus, including computer program products, for designating a memory region for receiving image frames from an image frame server, the image frames are from a first sequence of image frames. Each image frame in the first sequence of image frames is associated with a time position on a first timeline. A needed image frame is selected, the needed image frame associated with a second time position on a second timeline. The second time position is mapped on the second timeline to a first time position on the first timeline. The image frame server is requested to provide an image frame from the first sequence of image frames at the first time position on the first timeline.

31 Claims, 5 Drawing Sheets

(56) References Cited

U.S. PATENT DOCUMENTS

| | | | |
|---|---|---|---|
| 2003/0146915 | A1 | 8/2003 | Brook et al. |
| 2003/0197720 | A1 | 10/2003 | Moon et al. |
| 2003/0215214 | A1 | 11/2003 | Ma |
| 2003/0223733 | A1* | 12/2003 | Chang .................. 386/69 |
| 2003/0234772 | A1 | 12/2003 | Zhang et al. |
| 2004/0101272 | A1* | 5/2004 | Boston et al. .................. 386/46 |
| 2004/0125124 | A1 | 7/2004 | Kim et al. |
| 2004/0181747 | A1 | 9/2004 | Hull et al. |
| 2005/0058430 | A1 | 3/2005 | Nakamura |
| 2005/0091311 | A1 | 4/2005 | Lund et al. |
| 2005/0257152 | A1 | 11/2005 | Shimizu et al. |
| 2006/0088220 | A1 | 4/2006 | Cheung et al. |
| 2006/0182116 | A1 | 8/2006 | Shin |
| 2009/0150781 | A1 | 6/2009 | Iampietro et al. |

OTHER PUBLICATIONS

AviSynthFAQ I—Avisynth, 5 pages [online], [retrieved on Dec. 7, 2007]. Retrieved from the Internet URL: http://avisynth.org/medawiki/index.php?title=AviSynth_FAQ_I&printable=yes.

Avisynth—Luke's Video Guide, 3 pages [online], [retrieved on Dec. 7, 2007]. Retrieved from the Internet URL: http://neuron2/net/LVG/avisynth.html.

More about AviSynth—Avisynth, 2 pages [online], [retrieved on Dec. 7, 2007]. Retrieved from the Internet URL: http://avisynth.org/mediawiki/index.php?title=More_about_AviSynth&printable=yes.

Using a Frameserver between Premiere and TMPGEnc, Rui del-Negro 2003, 5 pages [online], [retrieved on Dec. 7, 2007]. Retrieved from the Internet URL: http://dvd-hq.info/Frameserver.html.

Snapshot from Jun. 13, 2006. Apple—Final Cut Studio—Motion 2—Integrate Seamlessly [online], [retrieved on Jun. 8, 2009]. Retrieved from the Internet: http://web.archive.org/web/20060623231620/www.apple.com/finalcutstudio/motion/integrateseamlessly.html.

Snapshot from Apr. 26, 2006. Apple—QuickTime—Tutorials—Reference Movies [online], [retrieved on Jun. 8, 2009]. Retrieved from the Internet: http://web.archive.org/web/20060426195544/http://www.apple.com/quicktime/tutorials/refmovies.html.

"Advisory Action", U.S. Appl. No. 11/458,982, (Oct. 1, 2010), 6 pages.

"Final Office Action", U.S. Appl. No. 11/458,982, (Jul. 22, 2010), 25 pages.

"Final Office Action", U.S. Appl. No. 11/458,982, (Sep. 21, 2009), 17 pages.

"Non-Final Office Action", U.S. Appl. No. 11/458,982, (Jan. 25, 2010), 25 pages.

"Non-Final Office Action", U.S. Appl. No. 11/458,982, (Mar. 6, 2009), 11 pages.

"Notice of Allowance", U.S. Appl. No. 11/458,982, (Dec. 2, 2010), 7 pages.

\* cited by examiner

CAPTURING FRAMES FROM AN EXTERNAL SOURCE

CLAIM OF PRIORITY

This application is a continuation application and claims priority under 35 USC §120 to U.S. patent application Ser. No. 11/458,982, filed on Jul. 20, 2006, now U.S. Pat. No. 7925978 the entire contents of which are hereby incorporated by reference.

BACKGROUND

The present disclosure relates to transferring image data between applications.

Typical timeline based video composition applications allow users to arrange sequences of image frames and portions of sound tracks along a timeline to create a multimedia composition. Sometimes another application is used to create special effects for image frames. For example, if a given image frame at a point on a timeline needs to be modified, the frame is typically exported to a special effects application and then re-imported back into the composition application. Rendering the frame by an application can take a significant amount of time depending on the complexity of the image and the effects which are applied to it. If there is more than one application using the same image frame, the image frame may end up being rendered redundantly. Moreover, the fact that users must leave one application to perform a task in another can result in delays and frustration.

SUMMARY

In general, in one aspect, embodiments of the invention feature designating a memory region for receiving image frames from an image frame server, the image frames being from a first sequence of image frames. Each image frame in the first sequence of image frames is associated with a time position on a first timeline. A needed image frame is selected, the needed image frame associated with a second time position on a second timeline. The second time position is mapped on the second timeline to a first time position on the first timeline. The image frame server is requested to provide an image frame from the first sequence of image frames at the first time position on the first timeline.

These and other embodiments can optionally include one or more of the following features. The requested image frame can be obtained from a designated memory region. An image frame server can be in a separate process space from processes requesting frames. The first sequence of frames can be obtained from a compositing application. The requested frame can be incorporated into the second sequence of frames associated with the second timeline. A proxy process can designate a second memory region for receiving image frames from a second image frame server.

In general, in another aspect, embodiments of the invention feature accepting a request from a client, the request identifying a first sequence of image frames, each image frame in the first sequence of image frames being associated with a time position on a first timeline. A memory region is designated that is accessible by the client and into which an image frame server can place one or more image frames from the first sequence of image frames. The image frame server is launched if the image frame server is not executing. A communication link is established between the client and the image frame server that the client can use to request an image frame from the image frame server and obtain the requested image frame from the designated memory region.

These and other embodiments can optionally include one or more of the following features. The image frame server is an interactive application that allows a user to modify the first sequence of image frames. The image frame server can be a non-interactive application. A second image frame server capable of serving the one or more image frames can be launched if the image frame server terminates. The image frame server and the client can execute on different computing devices.

In general, in another aspect, embodiments of the invention feature a client configured to send a request to a proxy, the request identifying a first sequence of image frames, each image frame in the first sequence of image frames being associated with a time position on a first timeline. The proxy is configured to identify an image frame server and provide information to one or more of the client or the image frame server to allow the client and the image frame server to communicate with each other. The image frame server is configured to provide one or more image frames from the first sequence of image frames to the client through a region of memory.

These and other embodiments can optionally include one or more of the following features. The proxy is configured to launch the image frame server if the image frame server is not executing. The proxy is configured to launch a new image frame server if the image frame server becomes unavailable.

Particular embodiments can be implemented to realize one or more of the following advantages. A rendered image can be communicated to a plurality of running applications. The applications can also exchange very large (e.g., High Definition) rendered images. An image used by more than one application only needs to be rendered once. Image frame servers are automatically launched or killed as needed. Images are communicated through shared memory regions. Users can see changes to individual frames without having to re-render an entire sequence of frames which can save a great deal of time. One application can benefit from another application's image processing and compositing capabilities without knowledge of the other application's internal workings.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
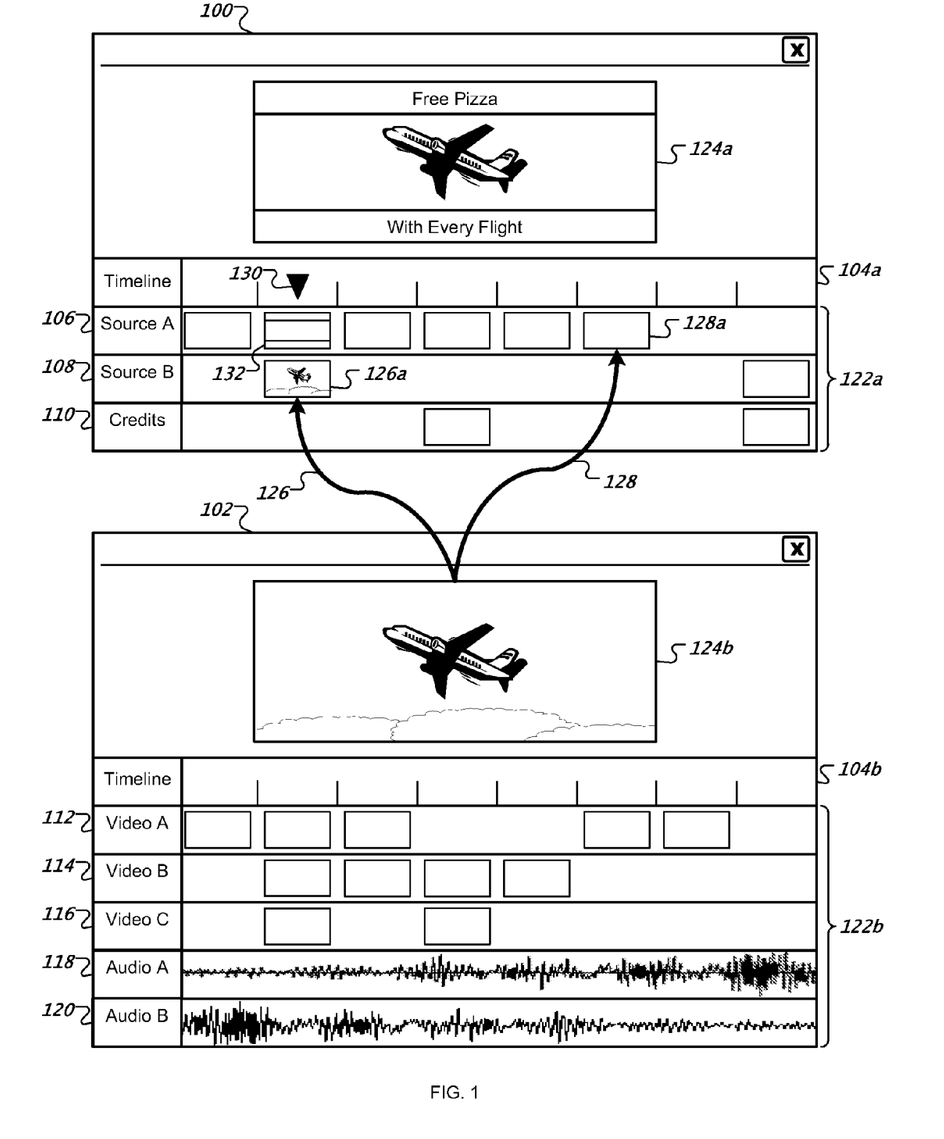
FIG. 1 is an example of a client user interface and an image frame server user interface.

FIG. 1 illustrates an example of a client user interface 100 for an executing client program and an image frame server user interface 102 for an executing image frame server program. An image frame server renders one or more image frames for use by one or more clients. A client can further process the image frames to produce a sequence of image frames, such as a video clip or a movie. In certain implementations, the client is a real-time, timeline based video editing application, such as the Adobe® Premiere® Pro application commercially available from Adobe Systems Incorporated of San Jose, California. In certain implementations, the image frame server is a digital motion graphics and compositing application, such as the Adobe® After Effects® application also commercially available from Adobe Systems Incorporated. In this example, the image frame server is an interactive application having a user interface. Alternatively, the image frame server is a non-interactive (i.e., no graphical user interface) application or a non-interactive instance of the image frame server which operates in the background possibly without a user's knowledge.

Various video standards are supported by the client, the image frame server, or both. Such video standards can include, but are not limited to, the NTSC (National Television System Committee), PAL (phase-alternating line), SÉCAM (sequential couleur à mémoire), SD (standard definition), HD (high definition), DV (digital video), Digital Betacam, DVCAM, DVCPRO, D5 HD, and HDV (high definition video) formats.

The client and the image frame server can each process a sequence of image frames that can have a different number of frames per second than the other. The client user interface 100 and the image frame server user interface 102 include timelines 104a-b, respectively. The timelines 104a-b indicate time positions for each particular image frame in a sequence of image frames (or other media) in a presentation, for example. The timelines 104a-b and the image time positions can be used either to reconcile differences in the number of frames per second, image time positions, or both, between the client and the image frame server.

The client user interface 100 displays sequences of image frames 106, 108, and 110. The image frame server user interface 102 includes sequences of image frames 112, 114, and 116 as well as audio sequences 118 and 120. The sequences of image frames 106, 108, and 110 are presented in a timeline panel 122a. The sequences 112, 114, 116, 118, and 120 are presented in a timeline panel 122b. Each image frame or section of audio in the timeline panels 122a-b corresponds to a particular position on the timelines 104a-b, respectively, and may not be in the same sequence.

A monitor panel 124a within the client user interface 100 presents a particular image frame showing an airplane together with text. A monitor panel 124b within the image frame server user interface 102 presents a particular image frame showing an airplane. The airplane image frame shown in the monitor panel 124b is a rendered composite of image and audio frames from a particular time position in the timeline 104b. As indicated by arrow 126, the client receives the rendered airplane image frame as image frame 126a in the sequence of image frames 108. As indicated by arrow 128, the client can receive another rendered image frame 128a at another time position and in another sequence of image frames, such as the sequence of image frames 106. The time position of the airplane image frame in the timeline 104b from the image frame server is mapped to the client's time position 130 in the sequence of image frames 108 within the client. The client processes the image frames at time position 130, including the rendered airplane image frame 126a and a text image frame 132, to form the composite airplane and text image frame shown in the monitor panel 124a.

Figure 2:
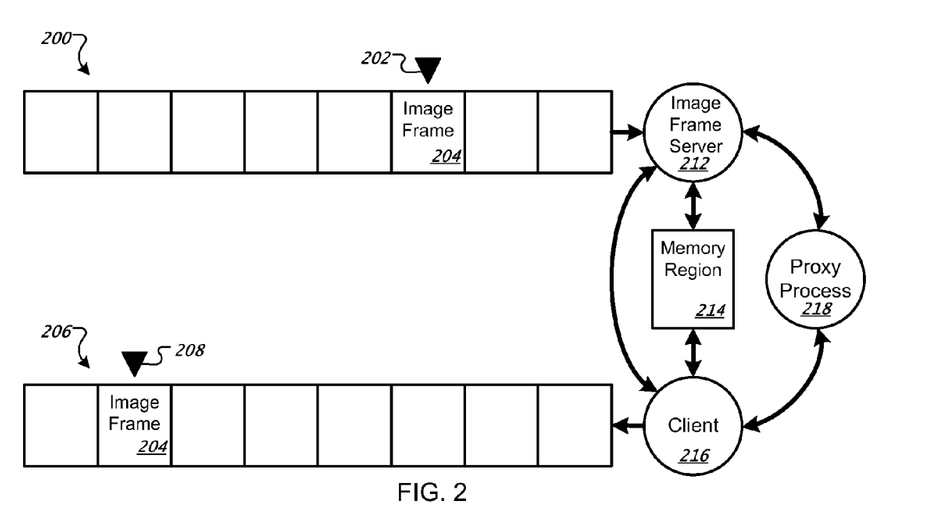
FIG. 2 is a schematic diagram showing an example of interactions between an executing client process, an image frame server process, and a proxy process.

FIG. 2 is a schematic diagram showing an example of interactions between an executing client process, an image frame server process, and a proxy process. A sequence of image frames 200 includes, at a time position (e.g., 202), an image frame 204. The image frame 204 is also used in a sequence of image frames 206 at another time position (e.g., 208). The client 216 need not process frames from timeline 206 in the same order the frames occur in timeline 200. An image frame server 212 places the image frame 204 from the time position 202 in a memory region 214. The placement of the image frame 204 in the memory region 214 is in response to a request from a client 216 for the image frame 204, for example. The client 216 retrieves the image frame 204 from the memory region 214 and uses the image frame 204 in the sequence of image frames 206 at time position 208. The image frame server 212 communicates, for example, the location of the memory region 214 to the client 216.

In some implementations, the operations of the client 216 are performed in a separate process space from the image frame server 212. In addition, the client 216 and the image frame server 212 can execute on different computing devices with the contents of the memory region 214 being communicated to the client 216, for example, over a network. Communication between processes (e.g., client 216, proxy 218 and server 212) can be asynchronous, synchronous, or combinations of these. Although a client-server architecture is described, other architectures are possible including peer-to-peer.

In some implementations, the interaction between the client 216 and the image frame server 212 can be coordinated by a proxy process 218. A request from the client 216 for image frames is directed to the proxy process 218. For example, the client 216 sends a request including an identifier of a sequence of image frames that contain the image frame 204 to the proxy process 218. The proxy process 218 then determines if an instance of an image frame server exists that has access to the requested image frame in a sequence of image frames. The proxy process 218 communicates the identity of the image frame server 212 instance to the client 216. The proxy process 218 also communicates the client request to the image frame server 212. The communication includes, for example, the location of the memory region 214 where the image frame 204 will be placed. Alternatively, the image frame server 212, the client 216, or a combination of the three processes determine the location of the memory region 214. The client 216 and the image frame server 212 can then negotiate the transfer of the image frame 204 (and other frames) through the memory region 214.

In some implementations, if no image frame server has a sequence of image frames including the requested image frame, the proxy process 218 launches the image frame server 212 to provide the requested image frame to the client 216. The image frame server launched by the proxy process 218 can optionally be a non-interactive image frame server or a non-interactive instance of an interactive image frame server. If, at a later time, an interactive image frame server is launched that can provide the requested image frame, the proxy process 218 can terminate the non-interactive image frame server. The newly launched interactive image frame server can then provide the image frame 204 to the client 216. Likewise, if an image frame server serving the image frame 204 to the client 216 terminates, then the proxy process 218 launches a new image frame server instance to provide the image frame 204. For example, if an interactive image frame server is terminated by a user, the proxy process 218 launches a non-interactive image frame server to provide the image frame 204.

Figure 3:
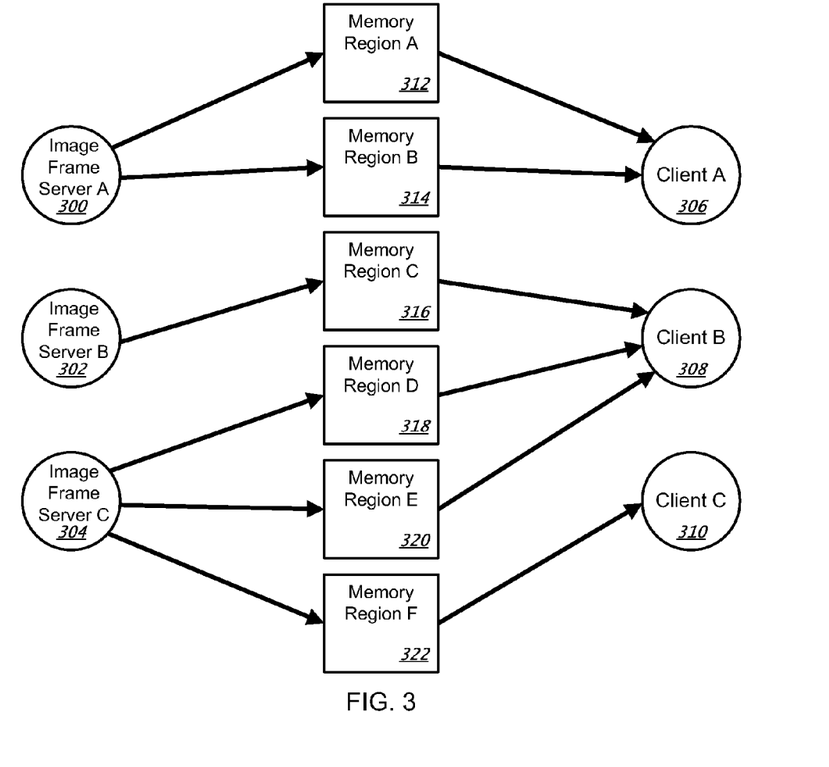
FIG. 3 is a schematic diagram showing an example of memory regions shared between image frame servers and clients.

FIG. 3 is a schematic diagram showing an example of memory regions shared between image frame servers 300, 302, 304 and clients 306, 308, 310. The image frame server A 300 shares a memory region A 312 and a memory region B 314 with the client A 306. The image frame server B 302 shares a memory region C 316 with the client B 308. In addition, the image frame server C 304 shares a memory region D 318 and a memory region E 320 with the client B 308. The image frame server C 304 also shares a memory region F 322 with the client C 310.

The proxy process 218 can designate one or more shared memory regions and facilitate the establishment of communication links between one or more image frame servers and one or more clients. An image frame server can copy a rendered image frame to a single memory region to be accessed by one or more clients. Alternatively, an image frame server can copy a rendered image frame to multiple memory regions with each memory region being accessed by one or more clients.

Figure 4:
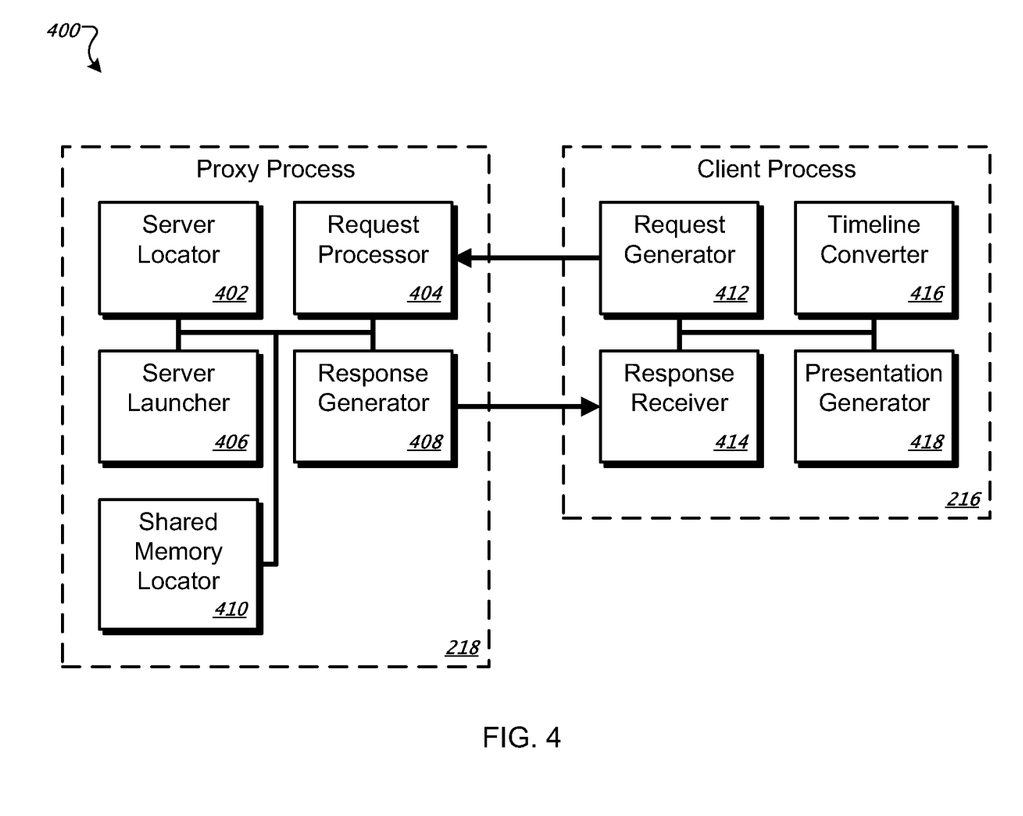
FIG. 4 is a block diagram showing an example of a system including a client and a proxy process.

FIG. 4 is a block diagram showing an example of a system 400 including the client 216 and the proxy process 218. The proxy process 218 in some implementations includes a server locator component 402, a request processor component 404, a server launcher component 406, a response generator component 408, and a shared memory locator component 410. The client process 216 includes a request generator component 412, a response receiver component 414, a timeline converter component 416, and a presentation generator component 418. The components in either the proxy process 218, the client process 216, or both, can contain more or fewer components and can be connected by one or more networks or other suitable means of communication. The components of the proxy process 218 and the client process 216 will be further described in detail below with respect to FIGS. 5 and 6.

Figure 5:
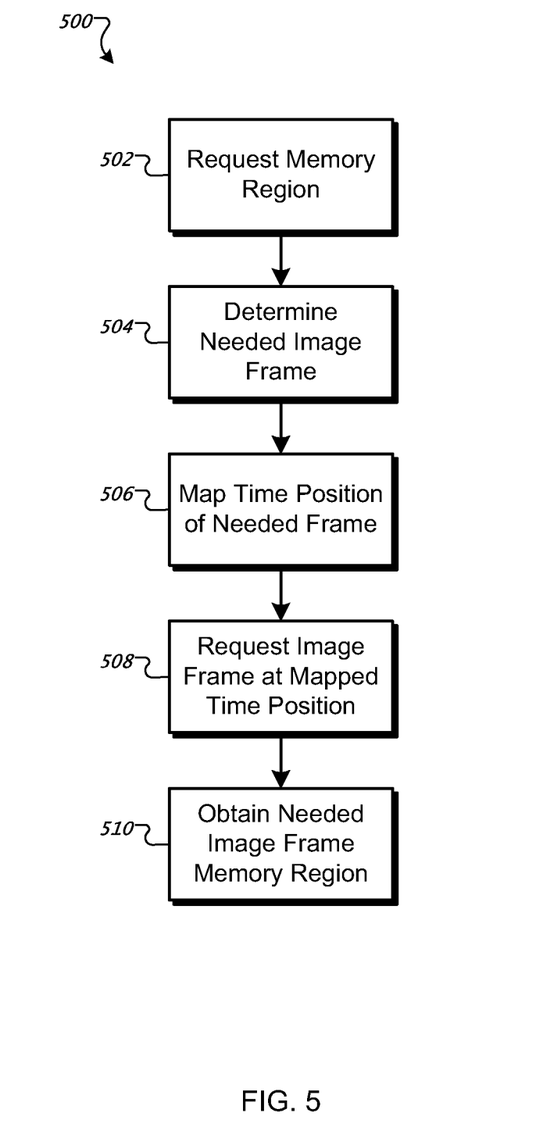
FIG. 5 is a flow chart showing an example of a process for obtaining an image frame from an image frame server.
Figure 6:
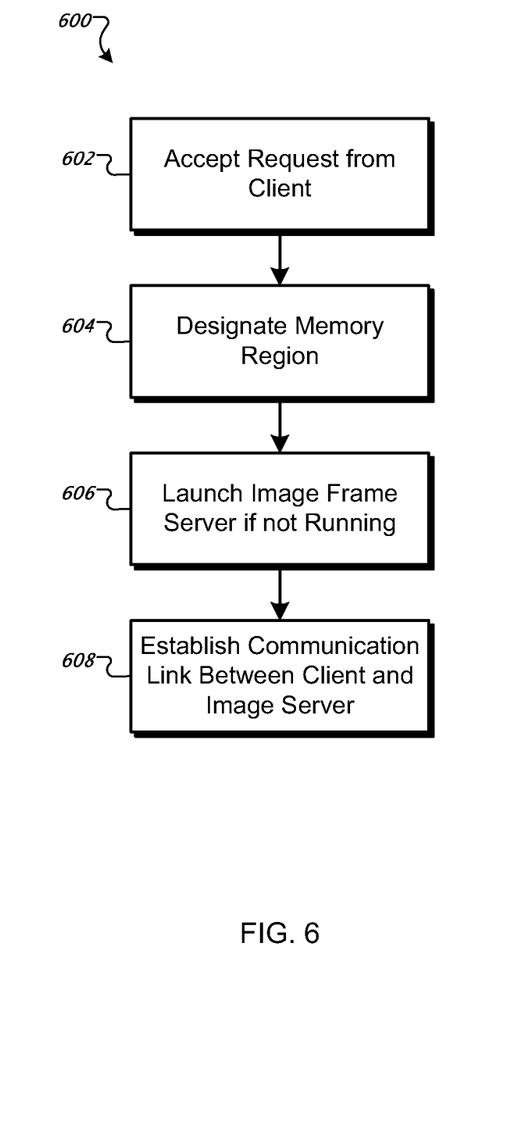
FIG. 6 is a flow chart showing an example of a process for establishing a communication link between a client and an image frame server.

FIGS. 5 and 6 are flow charts of example methods 500 and 600 for obtaining an image frame from an image frame server and for establishing a communication link between a client and an image frame server, respectively. The techniques 500 and 600 can be performed, for example, by a system such as the system 400 and, for clarity of presentation, the description that follows uses the system 400 as the basis of an example for describing these techniques. However, another system, or combination of systems, can be used to perform the techniques 500 and 600.

As shown in FIG. 5, technique 500 begins with a request that a proxy process designate a memory region for receiving image frames from an image server (step 502). The image frames are from a sequence of image frames accessible by the image frame server and each of the image frames is associated with a time position on an image frame server timeline. For example, the request generator 412 within the client process 216 can send a request to the proxy process 218 to designate the memory region 214.

A needed image frame is determined by the client (step 504). The time position on the client timeline of the needed image frame is determined (step 506). For example, the client process 216 determines that the image frame 204 associated with the time position 208 in the client sequence of image frames 206 is needed. The time position is then mapped to a time position on an image frame server's timeline (step 506). For example, the timeline converter 416 can map the time position 208 in the client sequence of image frames 206 to the time position 202 in the image frame server sequence of image frames 200. A request for the needed image frame at the mapped time position is generated (step 508). For example, the request generator 412 within the client process 216 can request that the image frame server 212 provide the image frame 204 from the time position 202 in the image frame server sequence of image frames 200. The needed image frame is obtained from the designated memory region (step 510). For example, the response receiver 414 can receive a response indicating the location of the memory region 214. The presentation generator 418 retrieves the image frame 204 from the memory location 214 and generates a presentation, such as the composite image frame shown in the monitor panel 124a.

As shown in FIG. 6, method 600 begins with accepting a request from a client identifying a sequence of image frames accessible by an image frame server (step 602). Each image frame in the identified sequence of image frames is associated with a particular time position on an image frame server timeline. For example, the request processor 404 of the proxy process 218 can accept a request from the client 216 identifying the image frame server sequence of image frames 200. A memory region accessible by the client is designated into which the image frame server can place one or more image frames from the identified sequence of image frames (step 604). For example, the shared memory locator 410 can locate the memory region 214 where the image frame server 212 can place the image frame 204 from the image frame server sequence of image frames 200. The memory region 214 is accessible by the client process 216.

An image frame server is automatically launched if there is not an image frame server running that is capable of delivering image frames from the identified sequence of image frames (step 606). For example, the server locator 402 of the proxy process 218 can determine if an image frame server is executing that has access to the identified sequence of image frames 200. If an image frame server is not executing, then the sever launcher 406 of the proxy process 218 launches an image frame server, such as the image frame server 212, that has access to the identified sequence of image frames 200.

A communication link between the client and the image frame server is established such that the client can request an image frame from the image frame server and obtain the image frame from the designated memory region (step 608). For example, the response generator 408 within the proxy process 218 can establish the communication link between the client 216 and the image frame server 212 by communicating the location of the memory region to one or both. The client process 216 can then request that the image frame server 212 place needed image frame or frames in the memory region 214 as needed by the client 216.

Embodiments and all of the functional operations described in this specification can be implemented in digital electronic circuitry, or in computer software, firmware, or hardware, including the structures disclosed in this specification and their structural equivalents, or in combinations of one or more of them. Embodiments can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims. For example, the actions recited in the claims can be performed in a different order and still achieve desirable results.

What is claimed is:

1. A computer-implemented method to control sharing of image frames between first and second timelines, the method comprising:

sending a request for the designation of a memory region configured to receive image frames of a sequence of image frames from an image frame server, the memory region being different from memory regions containing the first and second timelines, each of the image frames in the sequence is associated with a time position on the first timeline associated with the image frame server;

determining that one or more image frames of the sequence of image frames are to be used at a particular time position on the second timeline that is different from the first timeline;

subsequent to sending the request for the designation of a memory region, sending a request for the image frame server to copy the one or more image frames into the memory region; and receiving the one or more image frames from the memory region.

2. The computer-implemented method of claim 1, further comprising receiving a response indicating a location of the memory region.

3. The computer-implemented method of claim 1, further comprising mapping the particular time position on the second timeline to a time position of the one or more image frames on the first timeline.

4. The computer-implemented method of claim 1, further comprising using the one or more image frames to generate a composite frame included in a second sequence of image frames.

5. The computer-implemented method of claim 4 where the second timeline is related to the second sequence of image frames.

6. The computer-implemented method of claim 1, wherein the memory region can be accessed by a plurality of applications.

7. The computer-implemented method of claim 1, where:
the computer-implemented method of claim 1 is performed in a separate process space from the image frame server.

8. The computer-implemented method of claim 1, wherein the sequence of image frames is obtained from a compositing application.

9. The computer-implemented method of claim 1, further comprising:
sending the request for the designation of a memory region to a proxy process.

10. A computer-implemented method to control sharing of image frames between first and second timelines, the method comprising:

accepting a request from a client, the request identifying a first sequence of image frames, each image frame in the first sequence of image frames being associated with a time position on the first timeline;

responsive to the accepting, designating a memory region accessible by the client into which an image frame server can place one or more image frames from the first sequence of image frames, the memory region being different from memory regions containing the first and second timelines;

launching the image frame server if the image frame server is not executing; and subsequent to the designating, establishing a communication link between the client and the image frame server that is usable by the client to request an image frame from the image frame server and obtain the requested image frame from the designated memory region for use in the second timeline.

11. The computer-implemented method of claim 10, where:
the image frame server comprises an interactive application that allows a user to modify the first sequence of image frames.

12. The computer-implemented of claim 10, where:
the image frame server comprises a non-interactive application.

13. The computer-implemented method of claim 10, further comprising:
launching a second image frame server capable of serving the one or more image frames if the image frame server terminates.

14. The computer-implemented method of claim 3, further comprising:
the image frame server and the client execute on different computing devices.

15. A system to control sharing of image frames between first and second timelines, the system comprising:
one or more processors; and
one more computer-readable storage media having instructions stored thereon that, responsive to execution by the one or more processors, causes the one or more processors to perform operations comprising:
sending a request for the designation of a memory region configured to receive image frames of a sequence of image frames, the memory region being different from memory regions containing the first and second timelines, each of the image frames in the sequence is associated with the time position on a first timeline;
determining that one or more image frames of the sequence of image frames are to be used at a particular time position on the second timeline different from the first timeline; and
subsequent to sending the request for the designation of a memory region, sending a request for an image frame server to copy the one or more image frames into the memory region, the request identifying the sequence of image frames.

16. The system of claim 15, wherein the image frame server is further configured to provide the first sequence of image frames to the client process through the memory region.

17. The system of claim 15 wherein the client process is further configured to receive the particular image frame from the memory region.

18. The system of claim 15, wherein the first timeline is associated with the image frame server.

19. The system of claim 15, further comprising a proxy configured to receive the request from the client process.

20. The system of claim 19, wherein the proxy is further configured to identify the image frame server and provide information to one or more of the client process or the image frame server to allow the client process and the image frame server to communicate with each other.

21. The system of claim 20, where:
the proxy is configured to launch a new image frame server if the image frame server becomes unavailable.

22. The system of claim 20, where:
the proxy is configured to launch the image frame server if the image frame server is not executing.

23. A computer-implemented method to control sharing of image frames between first and second timelines, the method comprising:
sending, by a computing device, a request for the designation of a memory region on figured to receive image frames of a sequence of image frames from an image frame server, the memory region being different from memory regions containing the first and second timelines, each of the image frames in the sequence is associated with a time position on the first timeline associated with the image frame server;
determining, by the computing device, that one or more image frames of the sequence of image frames are to be used at a particular time position on the second timeline that is different from the first timeline; and subsequent to sending the request for the designation of a memory region, requesting, by the computing device, that the image frame server provide the one or more image frames.

24. The computer-implemented method of claim 23, further comprising: mapping the particular time position on the second timeline to a time position of the one or more image frames on the first timeline.

25. The computer-implemented method of claim 23, further comprising: generating, using the one or more frames, one or more composite frames included in a second sequence of image frames.

26. The computer-implemented method of claim 23, to perform further comprising:

obtaining the one or more image frames from the memory region.

27. The computer-implemented method of claim 23, further comprising:

obtaining the sequence of image frames from a compositing application.

28. A system to control sharing of image frames between first and second timelines, the system comprising:

one or more processors:

one or more computer-readable storage media having instructions stored thereon that, responsive to execution by the one or more processors, causes the one more processors to perform operations comprising:

accepting a request from a client, the request identifying a first sequence of image frames, each image frame in the first sequence of image frames being associated with a time position on the first timeline;

responsive to the accepting, designating a memory region accessible by the client into which an image frame server can place one or more image frames from the first sequence of image frames, the memory region being different from memory regions containing the first and second timelines;

launching the image frame server if the image frame server is not executing; and subsequent to the designating, establishing a communication link between the client and the image frame server that is usable by the client to request an image frame from the image frame server and obtain the requested image frame from the designated memory region for use in the second timeline.

29. The system of claim 28, where:

the image frame server comprises an interactive application that allows a user to modify the first sequence of image frames.

30. The system of claim 28, where:

the image frame server comprises a non-interactive application.

31. The system of claim 28, operable to cause the data processing apparatus to perform further operations comprising:

launching a second image frame server capable of serving the one or more image frames if the image frame server terminates.

\* \* \* \* \*

UNITED STATES PATENT AND TRADEMARK OFFICE
CERTIFICATE OF CORRECTION

PATENT NO. : 9,142,254 B2  
APPLICATION NO. : 13/082525  
DATED : September 22, 2015  
INVENTOR(S) : McGavran et al.

It is certified that error appears in the above-identified patent and that said Letters Patent is hereby corrected as shown below:

Column 10, claim 14, line 6, after "method of claim", delete "3", insert -- 13 --, therefor.

Column 10, claim 15, line 13, after "one", insert -- or --, therefor.

Column 10, claim 23, line 59, after "of a memory region", delete "on figured", insert -- configured --, therefor.

Column 11, claim 28, line 25, after "processors", delete ":", insert -- ; --, therefor.

Column 11, claim 28, line 28, after "one", insert -- or --, therefor.

Signed and Sealed this  
First Day of March, 2016

Michelle K. Lee  
*Director of the United States Patent and Trademark Office*